United States Patent [19]
Kotuby et al.

[11] 3,991,914
[45] Nov. 16, 1976

[54] EASILY ASSEMBLED, LEAKPROOF LIQUID DISPENSING PUMP

[75] Inventors: Paul M. Kotuby, Naugatuck; Edward A. Pettersen, Waterbury; Alvydas Velicka, Watertown, all of Conn.

[73] Assignee: The Risdon Manufacturing Company, Naugatuck, Conn.

[22] Filed: May 29, 1975

[21] Appl. No.: 581,906

[52] U.S. Cl. ............................... 222/321; 239/333; 137/533.17; 222/385
[51] Int. Cl.² ...................................... G01F 11/36
[58] Field of Search ............ 222/372, 383, 385, 321, 222/402.1, 402.24, 320, 321; 239/333, 360; 137/533.17, 533.19, 543.19, 543.21

[56] References Cited
UNITED STATES PATENTS

| 2,657,834 | 11/1953 | Bacheller | 222/321 |
| 3,044,413 | 7/1962 | Corsette | 222/321 |
| 3,187,960 | 6/1968 | Gorman | 222/383 |
| 3,282,472 | 11/1966 | Roder | 222/321 |
| 3,401,849 | 9/1968 | Weber | 222/402.1 |
| 3,613,728 | 10/1971 | Steiman | 222/402.24 |
| 3,877,616 | 4/1975 | Stevens | 222/321 |

*Primary Examiner*—Robert B. Reeves
*Assistant Examiner*—H. Grant Skaggs
*Attorney, Agent, or Firm*—St.Onge Mayers Steward & Reens

[57] ABSTRACT

An easily assembled, low cost, disposable pump is disclosed for use with household liquid product containers. The pump is designed to prevent leakage of the product regardless of container attitude and comprises hollow outer and inner cylinders, each having an end wall, the cylinders being nested in telescoped manner with their end walls in spaced adjacency to form an intake valve chamber and a superimposed product receiving and discharging pump chamber. Liquid inlet duct means is formed in the respective end walls of each cylinder for admission of fluid, and a plunger assembly including a hollow stem and a piston is slidably received in the inner cylinder for reciprocable pumping action therein. The hollow stem provides communication between the pumping face of the piston and atmosphere, via a check valve disposed in the stem. A second check valve is disposed in the valving chamber formed by the telescoped cylinders. The nested cylinders also define an enclosed annular passage intermediate their side walls, each cylinder having a vent conduit in its side wall communicating with this annular passage. The vent conduit of the outer cylinder is continuously open to the interior of the container, while that of the inner cylinder is closed by juxtaposition of the piston head in its normal extended position, but is open to provide communication to atmosphere along the piston stem above the piston head whenever the plunger assembly is depressed. The arrangement provides for venting the interior of the container to atmosphere during pumping operation, yet prevents leakage through the vent conduits between uses of the pump, regardless of container attitude.

5 Claims, 5 Drawing Figures

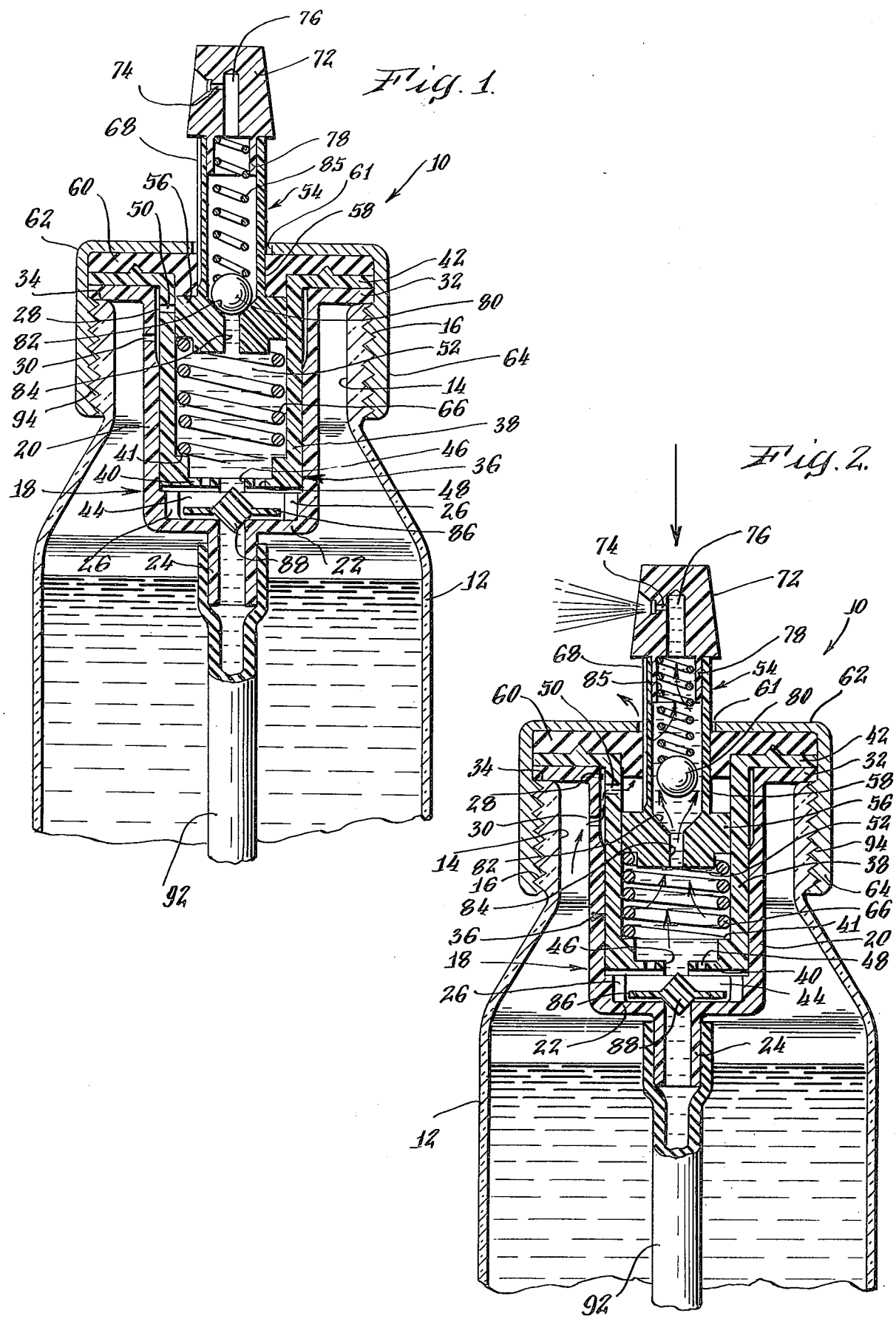

EASILY ASSEMBLED, LEAKPROOF LIQUID DISPENSING PUMP

BACKGROUND OF THE INVENTION

1. Field of the Invention

The present invention is directed to an easily assembled, leakproof liquid dispensing pump for dispensing liquid from a container, more particularly a container of the type used for packaging household products in convenient form for intermittent consumer use. Typical applications of the pump here concerned include use on portable containers for packaging liquid consumer products as diverse as household cleaners, polishes, lubricants, pesticides, room deodorizers, perfmes and other personal products such as antiperspirants and deodorants. These containers are generally adapted to be hand-held and the pump to be operated by one of the fingers of the user on that same hand. The containers have a wide variety of shapes and sizes, and may be fabricated from glass, plastic, metal, or any other material not adversely affected by the particular liquid desired to be stored.

Frequently the containers and liquid dispensing pumps, where used to package and dispense inexpensive liquid consumer products, are intended to be disposable after the container's contents have been used. Therefore, the dispensing pumps employed for such applications must be mechanically simple, having components which are inexpensive to manufacture and easy to assemble in order to make the package economically feasible.

Large numbers of these containers are commonly filled with liquid consumer products and capped with the dispensing pumps at a central loading or filling facility which then ships them to the usual retail distributing centers and consumer sales outlets. Often during shipment and stockroom handling, as well as during home use, the containers may be dropped or accidentally inverted. Therefore it is important that each dispensing pump have provision for preventing leakage from its associated container, regardless of the container attitude. A further consideration in pumps of this type is that they should be effective to dispense all of the liquid contents from the container, and this requires proper venting to permit complete evacuation of the contents. Such venting arrangement, however, must not give rise to leakage problems.

2. Description of the Prior Art

Many forms of pumps for dispensing liquids from a household container are presently known; for example, liquid pumps of this general type are disclosed in U.S. Pat. Nos. 2,547,109; 2,889,964; 2,956,509; 3,062;416; 3,228,347; 3,228,570; 3,229,864; 3,248,021; 3,331,559; 3,362,344; 3,399,836; 3,583,605; 3,744,849; 3,797,748; and 3,799,448.

In spite of such extensive work in the art, many of the pumps disclosed in the patents set forth above still have one or more drawbacks. Some, for example, are mechanically complicated and therefore expensive to manufacture and uneconomical for use in throw-away packaging. Other designs do not provide efffective sealing of the means employed for venting the interior of the container, as needed to obtain complete discharge of the contents; while othes do not provide efficient means for adequately venting air into the container to insure rapid emptying of the contents if so desired.

It is the purpose of the present invention to provide an improved dispensing pump of the type described which overcomes some of these drawbacks.

SUMMARY OF THE INVENTION

A preferred embodiment of the present invention is described below in greater detail, but in general this comprises an easily assembled, leakproof liquid dispensing pump capable of dispensing liquid from a container while preventing leakage from the container, regardless of container attitude. In general, the pump comprises a housing assembly consisting of an outer sleeve or cylinder having an end or bottom wall and an upstanding side wall, together with an inner sleeve or cylinder nested in telescoping relation within the outer cylinder, wherein the inner cylinder also has a bottom and an upstanding side wall. An apertured cap member forms the closure for the open end of the nested cylinders, and also serves for mounting the pump in the mouth of a container. The nested inner and outer cylinders form between them a lower valving chamber and an upper product receiving or pumping chamber separated by the inner cylinder bottom wall. The cylinders are also so formed as to define an annular passage between their side walls, and each cylinder has a vent conduit passing through its side wall into communication with the annular passage. As will appear more fully hereinafter, these conduits provide controlled venting to atmosphere of the interior of the container in which the pump is mounted, such control being effected by the pump piston. The piston is part of a plunger assembly which is reciprocable in the pump chamber. The assembly includes a hollow piston rod or stem, joined to the piston for reciprocating of the latter, the hollow stem communicating the under face of the piston to a discharge nozzle attached to the outer end of the stem. The plunger is biased by a compression spring to extend position relative to the inner cylinder, the stem passing through the centrally apertured cap member, with the piston abutting against the cap to limit the outer position of the plunger. In such extended position, the piston wall blocks off the vent conduit of the inner cylinder, thereby preventing escape of fluid contents even if the container is inverted. However the vent conduit is uncovered when the plunger is depressed, enabling venting of the interior of the container to occur as product is pumped out.

Appropriate double-acting check valves in the valve chamber of the pump housing, and in the hollow stem of the pump plunger, enable product to be discharged under pressure from a nozzle assembly on the outer end of the plunger stem, such nozzle assembly also serving as an actuator or finger pad for reciprocating the plunger to effect the pumping action.

The construction of the dispenser pump of the present invention provides several advantages. The nested cylinder construction facilitates automated assembly of the components, and the arrangement for using the nested cylinders to define an annular passage with which each of the vent conduits of the respective cylinders is always in communication simplifies assembly since no special attention to the angular orientation of the vent conduits need be given. Further, the nested cylinder arrangement provides an economical manner of forming a chamber for the intake valve, and this may be further shaped as described hereinafter to take better advantage of this arrangement.

Other objects, aspects and advantages of the invention will be pointed out in, or will be apparent from, the detailed description provided below in conjunction with the accompanying drawings.

BRIEF DESCRIPTION OF THE DRAWINGS

FIG. 1 is a vertical cross-sectional view of the preferred embodiment of the dispensing pump mounted in a container which is shown only fragmentarily, the pump plunger being shown in its elevated or normal "home" position;

FIG. 2 is a similar view with the plunger in depressed position;

DESCRIPTION OF THE PREFERRED EMBODIMENT

Figure 3:
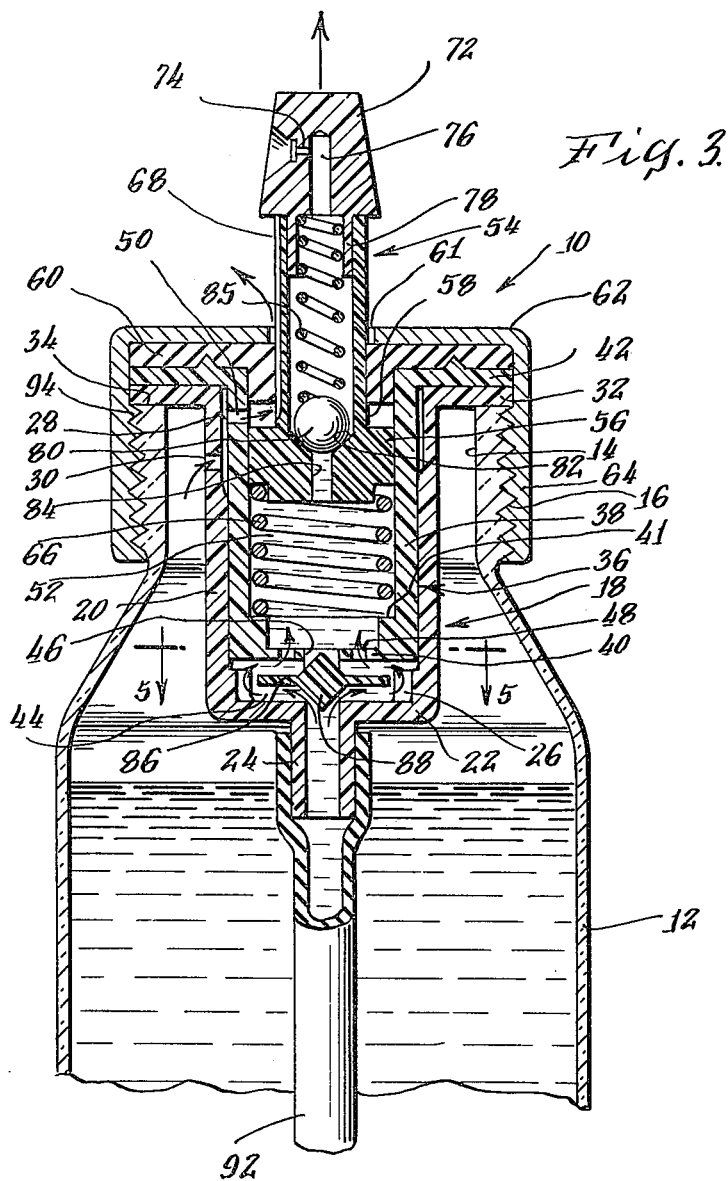
FIG. 3 is a similar view, representing the pump condition during the return stroke of the plunger.

FIG. 1 illustrates the dispensing pump of the present invention, generally indicated at 10, mounted in the mouth of a container, taking the form of a bottle 12 in this instance. Bottle 12 is formed with a neck 14 having a series of screw threads 16 disposed on its outer surface to serve as means for attaching the pump assembly to the bottle.

Pump 10 has a housing which includes an outer cylinder or sleeve 18 having a cylindrical side wall 20 terminating at its outer end in an annular flange 21 and having at its axial inner end a transverse bottom wall 22. An inlet conduit in the form of an integral tailpipe 24 is formed on bottom wall 22, coaxially with outer cylinder 18.

As shown in FIGS. 1–3 and 5, a series of radially inwardly directed ribs 26 is formed on the interior surface of side wall 18 adjacent its end wall 22. Further, an annular recess 28 is formed at the upper margin of the outer cylinder by means of a counterbore in the open end of side wall 20. A first vent conduit 30 in the side wall 20 communicates with annular recess 28. Though only one vent conduit 30 is illustrated, more than one may be provided in the outer cylinder 18. The outer cylinder is provided with an annular flange 32 which rests upon lip 34 of the bottleneck 14 when the dispenser pump is installed on the bottle.

Figure 5:
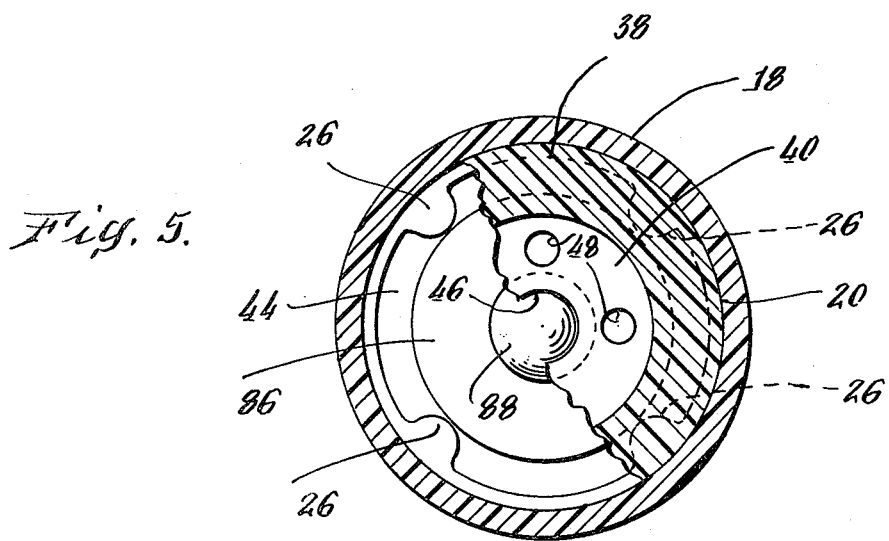
FIG. 5 is a horizontal cross-sectional view taken on plane 5—5 in FIG. 3 partly broken away to show details of construction for positioning the floating disc check valve.

The pump housing also includes an inner cylinder or sleeve 36 having a cylindrical side wall 38 and a generally transverse inner end or bottom wall 40. Cylinder 36 is nested telescopically in outer cylinder 18 to make a fluid tight fit therein. The inner cylinder likewise has an external annular flange 42 which overlies and abuts outer cylinder flange 32 and limits insertion of the inner cylinder into the outer cylinder so as to position the respective end walls 22 and 40 in spaced adjaceny to form inlet valve chamber 44. Bottom wall 40 has a central main inlet passage 46 and a number of smaller secondary inlet passages 48 circumferentially disposed about main inlet 46. This configuration is best shown in FIG. 5.

At least one vent conduit 50 is provided in the inner cylinder side wall 38 to communicate with annular recess 28. Thus, a complete vent passageway is defined from the interior of the container, through outer cylinder vent conduit 30 annular recess 28 and inner cylinder vent conduit 50 to the interior face of the inner cylinder. This venting configuration permits easy assembly of the inner and outer cylinders without concern for the angular orientation and hence registration of the vent conduits 30 and 50.

The interior of the inner cylinder 36 defines a product receiving and discharging pump chamber 52. A plunger 54, having an enlarged piston head 56 and a hollow stem or rod 58, is reciprocally mounted in chamber 52 to make a sliding fit therein. Stem 58 projects axially outward of chamber 52 at the open end thereof, passing through a resilient shouldered annular sealing grommet 60 and through the central aperature 61 of a closure cap 62. Cap 62 has a threaded skirt 64 by which it is adapted to be secured to the threaded bottleneck 16 to mount the pump assembly in the mouth of the container. Cap 62 thus clamps grommet 60, inner cylinder flange 42 and outer cylinder flange 32 against lip 34 of the bottleneck in sealing relation thereto.

A coil spring 66 is compressed between an annular shelf 41 adjaent bottom wall 40 of cylinder 36 and the piloted underface of piston 56 to urge plunger 54 upwardly to a "home" position in which piston 56 abuts grommet 60. As shown in FIG. 1, the side wall of piston 56 closes vent conduit 50 when the plunger is disposed in this normal position.

An axial vent groove 68 is formed in the outer surface of stem 54. As shown in FIG. 1, vent groove 68 terminates above piston 56 and thus venting along this groove is interrupted by abutment of the upper face piston 56 against grommet 60 in the "home" position of the plunger. However communication is established between atmosphere and the pump chamber 52 above the piston whenever the plunger is depressed. Thus, the vent groove, the vent conduits, and the annular passage between the inner and outer cylinders provide a controlled vent passageway from the exterior to the interior of the container. To facilitate free reciprocal movement of the plunger as well as free venting through the axial vent groove 68, the central aperture 61 in cap 62 is made somewhat larger than the diameter of the plunger stem.

A nozzle 72 is mounted on top of the plunger stem 58, and has a discharge orifice 74 that communicates with a leader conduit 76 which in turn communicates with the interior bore of the plunger 54. The nozzle may be manufactured in conventional fashion to dispense liquid as a fine spray, as a stream, or in any other desired manner. As shown in FIGS. 1 through 3, the nozzle is formed with a depending sleeve 78 which is pressfitted into stem 58 to complete the interengagement of the two, although an adhesive may also be used.

A plunger check valve in the form of a ball 80 is mounted in stem 58. A valve 82 formed at the base of the interior bore of the stem is adapted to cooperate with the ball to close central port 84 in piston 56.

Port 84 provides the means for discharging liquid product from pumping chamber 52 through stem 58 and nozzle 72 during the inward stroke of the plunger. A light coil spring 85 is retained in the stem between nozzle 72 and check ball 80 simply to bias the check valve to closed position regardless of whether the container is upright or inverted.

An intake check valve in the form of a plastic disc 86 is loosely retained in the lower valving chamber 44.

Figure 4:
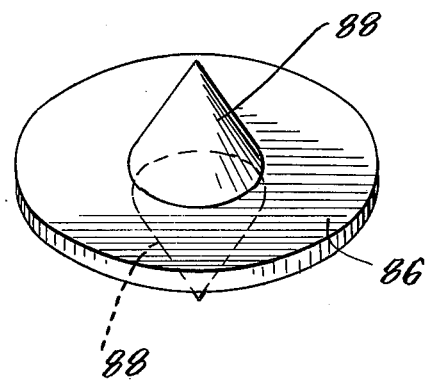
FIG. 4 is a perspective view on enlarged scale of a floating disc check valve member.

The disc is shown in detail in FIG. 4 to be of axially symmetrical configuration, having oppositely directed conical projections 88, the surface of either one of which is adapted to form a line contact seal at the upper rim of inlet conduit 24 when seated during a compression stroke. The disc is made symmetrical on its opposite faces to simplify automated assembly; i.e., it is immaterial which face is placed up or down in the valve chamber. The inwardly projecting ribs 26, described above, serve to maintain the floating disc check valve 86 generally centered in proper position in the lower valving chamber 44. The under surface of bottom wall 40 is radially channeled which serves to prevent the floating disc check valve 86 from sealing against the secondary inlets 48.

A dip tube 92 is coupled to the outer cylinder inlet, namely tailpipe 24, and extends to the bottom of the container 12 to conduct the liquid contents to the pump assembly described above. Usually the container is formed with a slightly convex bottom surface and the dip tube is directed to the juncture of the bottom and side container surfaces.

The unique valving and venting arrangement of the liquid dispensing pump of the present invention provides several advantages. As shown in FIGS. 1 through 3, the vent is only open when the plunger is depressed, that is, while the pump is being operated, and closes automatically on discontinuing that operation. This insures that the container will be properly vented when needed so that fluid will pump into the product receiving chamber to be dispensed from the discharge orifice by depression of the plunger. The plunger (outlet) check valve, biased closed by a coil spring, prevents leakage from the dispenser pump in rest position so that even if the container is accidentally inverted, leakage does not occur.

The unique construction of the liquid dispensing pump of the present invention is mechanically simple and easy to assemble. Accordingly, it may be used with particular advantage in applications where the container and the dispensing pump are disposed of after the container's contents are used up. Assembly of this pump is easily accomplished as follows: The outer cylinder 18 is held by an appropriate assembling machine. The floating disc check valve is dropped into the outer cylinder, being automatically aligned by the conical projection 88 and by the inwardly projecting ribs formed on the inner wall of the outer cylinder at its lower margin. The inner cylinder is then press-fitted into the outer cylinder to form the lower valving chamber completing the floating check valve assembly. The main plunger return spring 66 is then dropped into the inner cylinder and the plunger assembly is inserted into the product receiving chamber against that return spring. The annular seal 60 is then slipped over the plunger stem and pressed down against the inner cylinder flange. The cap is dropped over the plunger stem and the overlaying outer and inner cylinder flanges and annular seal then snapped past the threads in the cap which act to retain the parts in assembled relation. The outlet valve check ball and its compression spring are then dropped into the inner bore of the plunger stem and the plunger is then capped by the nozzle.

Accordingly, the liquid dispensing pump of the present invention may be assembled by automation using a rotary indexing head to move a developing assembly from on station to the next, merely dropping one component into the preceding component until the entire pump is assembled. No attention need to paid to the registry of the inner and outer vent conduits 50 and 30. Further, this construction provides a simplified means for providing a lower check valve mounted in a lower valving chamber.

Although a specific embodiment of the liquid dispensing pump of the present invention has been disclosed in detail above, it is to be understood that this is for purposes of illustration. This disclosure should not be construed as limiting the scope of the invention, since changes may be made in the described structure by those skilled in the art in order to adapt this liquid dispensing pump to particular applications without departing from the scope of the following claims.

What is claimed is:

1. An easily assembled, self-venting, leakproof liquid dispensing pump for dispensing liquid from a container while preventing leakage therefrom regardless of container attitude, said dispensing pump comprising:

hollow outer cylinder means having an open end and first vent conduit means passing through the wall of said cylinder means, said outer cylinder means being closed at its other end and having first axial inlet means thereat, hollow inner cylinder means likewise having an open end and second vent conduit means passing through the wall of said inner cylinder means, said inner cylinder means being closed at its other end and having thereat second axial inlet means including a main axial inlet and a plurality of secondary inlets disposed about said main axial inlet;

said inner cylinder means being nested in said outer cylinder means to form a lower valving chamber and a pumping chamber, and to define an annular passage between the side walls of said outer and inner cylinder means, said first and second vent conduit means communicating with said annular passage, said second vent conduit means also communicating with said pumping chamber, and said outer cylinder means being formed with at least three axially extending ribs on its inner wall in the region of said lower valving chamber;

a plunger, mounted in said pumping chamber for reciprocal movement out of and back to a "home" position to which it is normally biased, said plunger having a piston and a hollow stem and associated piston port defining a flow passage communicating between atmosphere and said pumping chamber below said piston, said piston being adapted to cover and close said second vent means when said plunger is in said "home" position, and vent groove means along the exterior of said hollow stem communicating between atmosphere and said pumping chamber above said piston when said plunger is depressed;

nozzle means mounted on the end of said plunger stem having discharge orifice means communicating with said flow passage of said plunger;

resilient means for urging said plunger to said "home" position;

lower check valve means for preventing return flow through said outer cylinder inlet means, said lower check valve means comprising a disc, centered in said lower valving chamber for free valving movement by said ribs, and opposing axially located conical projections on opposite disc faces, one of said projections cooperating with said outer cylinder inlet means to form a check valve seat and valve member, the other of said projections cooperating with said inner cylinder main inlet to limit movement of said check valve means toward said inner cylinder to prevent said lower check valve means from sealing against said secondary inlets;

upper check valve means, disposed in said plunger stem to prevent return flow therethrough, comprising a ball valve, a valve seat formed about said piston port and spring means mounted in said flow passage for urging said ball valve into closed engagement with said valve seat; and means for closing the open ends of said cylinder means said closing means being apertured to receive said plunger stem for projection outwardly of said nested cylinders and to allow reciprocation of said plunger, said closing means also serving to attach said dispenser pump in the mouth of a container and thereby close such container.

2. A dispensing pump as defined in claim 1, wherein said annular passage between said cylinders is disposed adjacent their open ends.

3. A dispensing pump as defined in claim 2, wherein the open end of said outer cylinder is counterbored to provide said annular passage.

4. A dispensing pump as defined in claim 1, wherein each of said cylinders is formed at its open end with an external annular flange, said flanges being arranged in overlying abutment whereby the flange on the inner cylinder limits the nested insertion of that cylinder in the other, spacing its closed end axially from that of the outer cylinder and thereby forming said lower valving chamber.

5. A dispensing pump as defined in claim 4, wherein said closing means for the open ends of said cylinders is a threaded cap and said cylinder flanges form an interference fit with the threads thereof to retain said cap on the pump, said closing means also including a resilient annular grommet disposed between the apertured end of the cap and said cylinder flange means and forming a sliding seal about said plunger stem.

* * * * *